United States Patent [19]

Cunningham

[11] 4,068,571
[45] Jan. 17, 1978

[54] COOKING OIL CLEANER AND FILTER SYSTEM FOR DEEP FAT FRYERS

[76] Inventor: Cecil R. Cunningham, 1912 Mockingbird Lane, Altus, Okla. 73521

[21] Appl. No.: 682,395

[22] Filed: May 3, 1976

[51] Int. Cl.² .............................................. A47J 37/12
[52] U.S. Cl. ...................................... 99/408; 210/171
[58] Field of Search ................ 99/408, 330, 444, 445, 99/446; 210/153, 164, 167, 171, DIG. 8

[56] References Cited

U.S. PATENT DOCUMENTS

| | | | |
|---|---|---|---|
| 2,448,157 | 8/1948 | Schneider | 210/167 X |
| 2,578,129 | 12/1951 | Daugherty | 99/408 |
| 2,733,815 | 2/1956 | Kwochka et a. | 99/408 UX |
| 2,780,984 | 2/1957 | Kleeman | 99/408 |
| 3,107,601 | 10/1963 | Longmire | 99/408 X |
| 3,203,754 | 8/1965 | Young et al. | 210/167 X |
| 3,389,801 | 6/1968 | Sieger | 210/171 X |
| 3,447,685 | 6/1969 | Bircher | 99/408 X |
| 3,483,982 | 12/1969 | Nelson | 99/408 X |
| 3,614,924 | 10/1971 | Hickey | 99/408 X |
| 3,797,378 | 3/1974 | Morris | 210/DIG. 8 |

Primary Examiner—Leonard D. Christian
Assistant Examiner—Arthur O. Henderson
Attorney, Agent, or Firm—William R. Laney

[57] ABSTRACT

A cooking oil cleaner and filter system for deep fat fryers which includes a fryer well for containing either cooking oil to be used in frying, and a cooking oil filtration and recirculation assembly connected to the well. The cooking oil filtration and recirculation assembly is substantially cylindrically shaped and includes a filter housing having a cylindrical outer surface connected to and longitudinally aligned with a pump housing also having a cylindrical outer surface and an aligned pump drive motor mounted on the pump housing. A suitable filter medium is disposed within a filter cavity in the filter housing with a foraminous partition extending across the filter cavity intermediate the filter medium and the pump housing. A gear pump is located in the pump housing and is drivingly secured to the pump drive motor output shaft, with the inlet port of the gear pump communicating with the filter cavity and with the outlet port communicating by means of a suitable conduit with the well. Another conduit communicates between the filter cavity and the opposite end of the well. In operation, the gear pump draws cooking oil from the well through the filter medium in the filter housing and pumps clean, filtered cooking oil from the pump housing through the connecting conduit to the opposite end of the well. The cooking oil filtration and recirculation assembly can be quickly and easily removed from the well and disassembled for cleaning or renewing the filter, and also for maintaining and servicing the gear pump.

21 Claims, 5 Drawing Figures

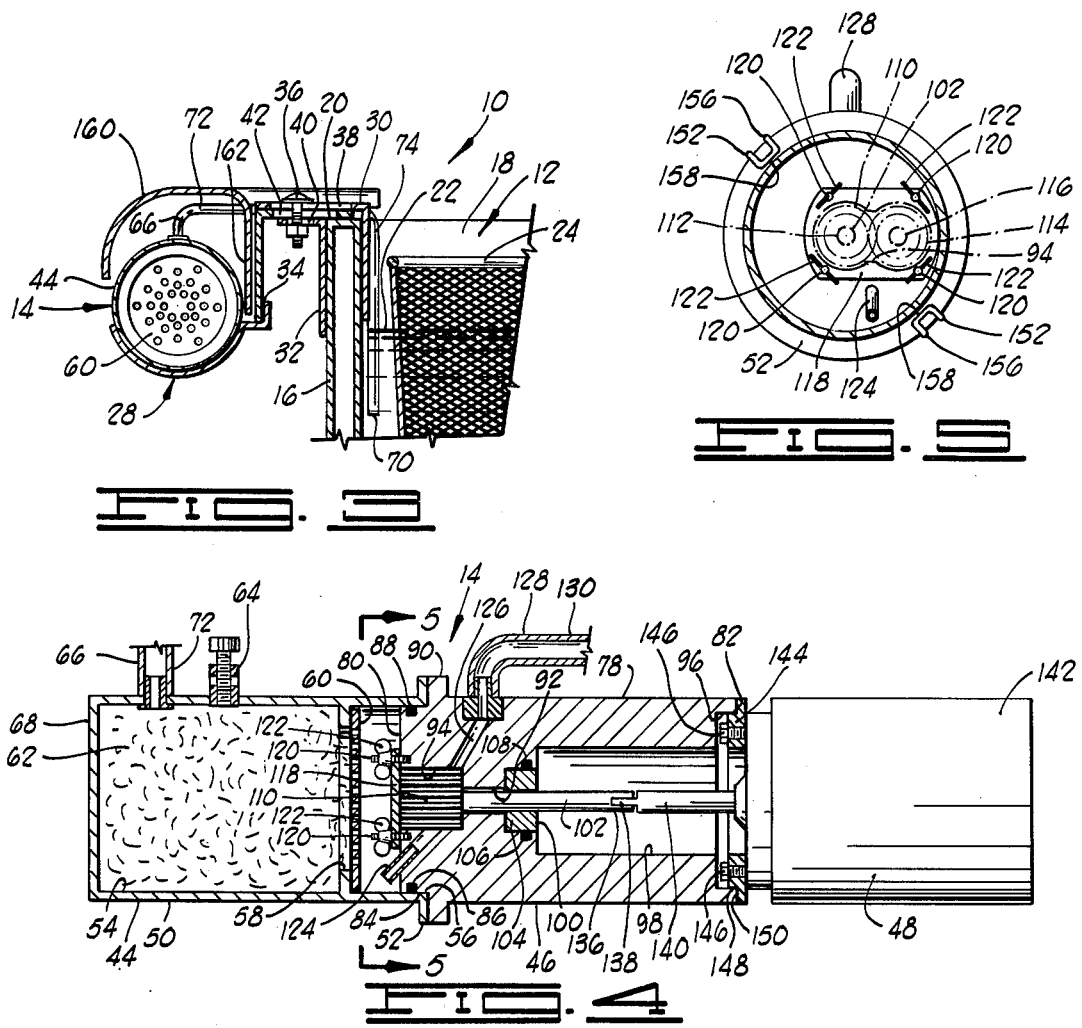

COOKING OIL CLEANER AND FILTER SYSTEM FOR DEEP FAT FRYERS

BACKGROUND OF THE INVENTION

1. Field of the Invention

This invention relates to filtering systems for use in conjunction with deep fat fryers, and more particularly, but not by way of limitation, to a quickly attachable, selfcontained cooking oil filtration and recirculation system which can be used continuously to filter and recycle cooking oil used in a deep fat fryer.

2. Description of the Prior Art

A prevalent practice in commercial eating establishments, such as restaurants and cafes, is to prepare certain foods by means of deep fat cooking. In this culinary technique, the foods are immersed in a heated cooking oil. Typically, chicken, potatoes, onions and fish may be cooked in this fashion. In some instances, the food to be cooked is covered with flour or dough before immersion in the cooking oil.

A problem which has been encountered with deep fat cooking is the accumulation of burned grease and food particles in the well of the cooker over extended periods of time, deleteriously affecting the flavor of the foods to be cooked, and requiring periodic cleaning of the well after draining all the cooking oil therefrom. The carbonaceous material resulting from prolonged burning of fats and oils is often difficult to remove, and the cleaning procedure results in undesirable down time on the cooker.

A number of patents have recently been issued on proposals for improving the deep fat cooking process by continuously filering the cooking oil used therein. Most continuous filtration systems provide some form of foraminous or perforated filter element in association with a pump which continuously draws or pumps the cooking oil from the well of the deep fat fryer through the filter elements, and then recycles the clean cooking oil to the well after filtration.

Examples of systems which have recently been patented for the purpose of automatically filtering and recycling the cooking oil to a deep fat cooking apparatus are U.S. Pat. Nos. 3,447,685 to Bircher; 3,415,181 to Hart; 3,477,361 to Bradshaw; and 3,483,982 to Nelson. Of these several patented systems, the Nelson system provides several advantages in that the filtering and pumping components of the system are located outside the deep fat fryer, and thus do not interfere with the positioning of food receptacles in the well of the fryer. The Nelson system includes a filter device which is separately supported and spaced from a motor and pumping unit used to draw the cooking oil from the well of the fryer through the filter, and to then recycle it to the well of the fryer. Several conduit connections are provided between the filtering unit and the pump employed in the Nelson system, as well as between this pump and the well of the fryer.

Additionally, U.S. Pat. No. 3,685,433 to Cunningham discloses a relatively compact and easily connected dual filter and pumping subassembly which is adapted for connection to the existing drain cock of the drain conduit of a deep fat fryer. The subassembly is ordinarily disposed beneath the countertop upon which the deep fat fryer is supported necessitating the employment of a relatively long conduit from the pump for returning the filtered cooking oil to the deep fat fryer well.

SUMMARY OF THE INVENTION

The present invention contemplates an improved compact, self-contained, easily connectable and maintainable filter and pumping assembly which can be quickly and easily attached and removed from the wall of an open topped well of a conventional deep fat fryer. The filtration and recirculation assembly is entirely self-contained and comprises a filter housing, pump housing and pump drive motor mutually interconnected to form a rigid, longitudinal cylindrical unit. The filter housing and the pump housing may be quickly and easily separated from the pump drive motor to permit maintenance, cleaning and replacement of the filter medium.

Broadly described, the present invention is directed to a cooking oil filtering and recirculating system adapted for use with a deep fat fryer of the type having a well formed therein for containing cooking oil. The system comprises a substantially cylindrically shaped cooking oil filtration assembly having a longitudinal axis. The filtration assembly includes a filter housing having a longitudinal cylindrical outer surface and having a filter cavity formed therein communicating with an open transverse end portion thereof; and a pump housing having a longitudinal cylindrical outer surface coaxially aligned with the outer surface of the filter housing and having first and second transverse end portions, the first end portion thereof communicating with the open end portion of the filter housing. A filter medium is disposed within the filter cavity for filtering cooking oil passing therethrough. The filtration assembly further includes pump means disposed in the pump housing and having a first port communicating with the open end portion of the filter housing and a second port communicating with the outer surface of the pump housing for pumping cooking oil through the pump housing. A motor is mounted on the second end portion of the pump housing and includes an output shaft drivingly connected to the pump means. The cooking oil filtering and circulating system further includes a first conduit communicating with the filter cavity for conveying cooking oil between the well of a deep fat fryer and the filter cavity, and a second conduit communicating with the second port of the pump means for conveying cooking oil between the pump means from the well of a deep fat fryer.

In a preferred embodiment of the invention, the cooking oil filtration assembly is supported by a suitable bracket adjacent the rim of a deep fat fryer well, or upon any suitable supporting surface near the fryer well, and is connected by the first and second conduits to the interior of the well for use in combination therewith.

An important advantage of the invention resides in the provision of a deep fat fryer assembly which includes a compactly constructed cooking oil filtration and recirculation system which can be quickly and easily attached to the well of a deep fat fryer to provide for continuous filtration and recirculation of cooking oil used in the deep fat fryer.

Another advantage of the invention resides in the provision of a system of filtration and recirculation of cooking oil to a deep fat fryer which system is compactly constructed and which affords rapid and easily accomplished access to the filtration and pumping elements included therein to facilitate maintenance and cleaning of these elements.

BRIEF DESCRIPTION OF THE DRAWINGS

FIG. 3 is a cross-sectional view taken along line 3—3 of FIG. 2.

FIG. 4 is a cross-sectional view of the cooking oil filtration and recirculation assembly taken along line 4—4 of FIG. 2.

FIG. 5 is a cross-sectional view taken along line 5—5 of FIG. 4.

DESCRIPTION OF THE PREFERRED EMBODIMENT

Figure 1:
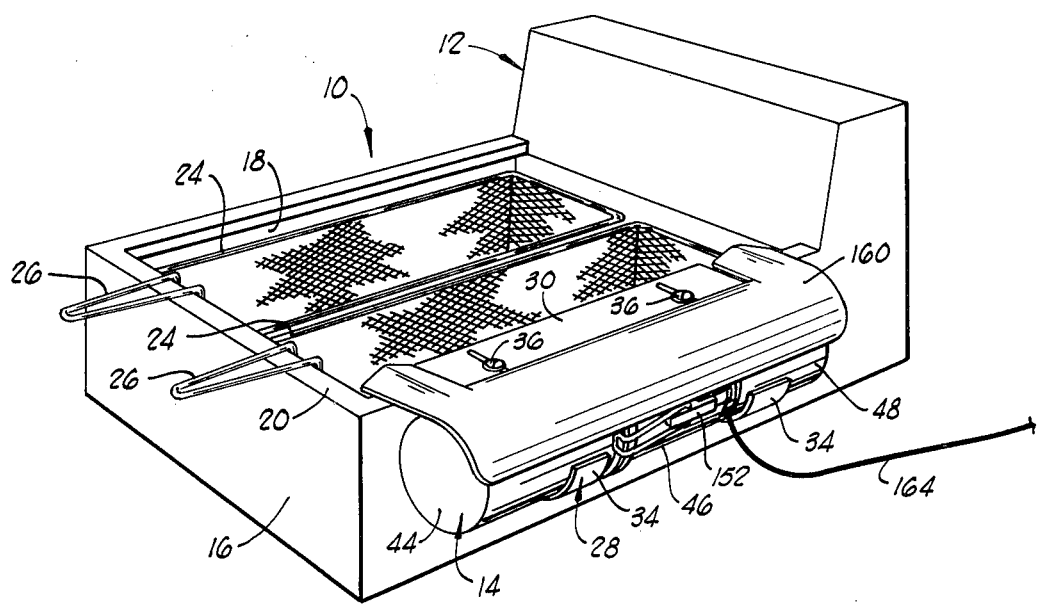
FIG. 1 is a perspective view illustrating the deep fat fryer assembly of the present invention with the cooking oil filtration and recirculation assembly installed on the rim of the cooking oil well thereof.

Referring now to the drawings, the deep fat fryer assembly of the present invention is generally designated therein by the reference character 10. The deep fat fryer assembly generally comprises a cooking oil heating unit 12 and a cylindrically shaped cooking oil filtration and recirculation assembly 14.

The cooking oil heating unit 12 comprises a housing 16 having an open topped well 18 formed therein in which the cooking oil is housed while being heated by the cooking oil heating unit. The housing 16 includes a substantially horizontal rim 20 which extends around at least a portion of the top of the well 18. As shown in FIG. 3, a quantity of cooking oil 22 is disposed within the well 18 and, when properly heated therein, is utilized for frying certain types of comestibles. In a widely used cooking technique, the type of food cooked in the fryer may, for example, be thinly sliced potatoes. The slices of the potatoes are contained in wire mesh baskets 24 having handles 26 formed thereon to facilitate manipulation of the baskets within the well. Within the housing 16, and disposed about the well 18 are a plurality of heating elements (not shown) which maintain the cooking oil in a heated state adequate for cooking purposes.

The cooking oil filtration and recirculation assembly 14 is mounted on the cooking oil heating unit 12 by means of a support bracket assembly 28. The support bracket assembly 28 comprises an inner angle bracket 30, an outer angle bracket 32 and a filtration assembly support bracket 34, each of which is preferably formed of sheet metal such as stainless steel. The inner angle bracket 30 extends over the rim 20 of the well 18 and downwardly within the well. The outer angle bracket 32 extends downwardly along the exterior of the housing 16. A portion of the filtration assembly support bracket 34 extends horizontally between corresponding horizontal portions of the inner and outer angle brackets 30 and 32 and the brackets 30, 32 and 34 are mutually secured together, as illustrated in FIG. 3, by threaded bolts 36. The bolts 36 extend through slots 38, 40 and 42, formed respectively in the brackets 30, 32 and 34, which permit relative sliding movement among the brackets 30, 32 and 34 to accommodate suitable adjustment of the brackets prior to the tightening of the bolts 36.

The cooking oil filtration and recirculation assembly 14 comprises a filter housing 44, a pump housing 46 and a pump drive motor 48. The filter housing, pump housing and pump drive motor are each substantially cylindrically shaped and are mounted in longitudinal alignment to form a substantially cylindrically shaped cooking oil filtration and recirculation assembly.

The filter housing 44 has a longitudinal cylindrical outer surface 50 which communicates with a radially outwardly extending flange 52 at one end thereof. A filter cavity 54 is formed within the filter housing 44 which communicates with the open transverse end portion 56 of the filter housing. A radially inwardly extending annular flange 58 is formed within the filter cavity 54 adjacent the open end portion 56. A foraminous partition 60 extends across the filter cavity 54 and is positioned intermediate the flange 58 and the open end portion 56. A quantity of filter medium or material 62 is disposed within the filter cavity 54 and may be suitably formed of a quantity of metal turnings, such as copper turnings, to provide means for filtering or straining cooking oil passing therethrough as will be described hereinafter. Alternatively a folded cheesecloth filter element can be placed over the foraminous partition.

A suitable suction relief valve is mounted in the wall of the filter housing 44 and provides selective communication between the filter cavity 54 and the atmosphere is response to manual manipulation thereof. A conduit 66 extends through the wall of the filter housing 44 adjacent the closed in portion 68 thereof and extends from the filter housing into the well 18 of the heating unit 12 terminating at a point 70 near the bottom of the well beneath the surface of the cooking oil 22 therein. The conduit 66 preferably comprises two segments 72 and 74, telescopically related and sealingly interconnected by means of a compression nut coupling 76. This construction of the conduit 66 permits the length of the horizontal run of the conduit to be adjusted so that the portion 74 of the conduit extending into the well and below the surface of the cooking oil can be positioned against the wall of the well to minimize the intrusion thereof into the working area of the well.

The pump housing 46 has a longitudinal cylindrical outer surface 78 and first and second transverse end portions 80 and 82. A second cylindrical outer surface 84 is formed on the pump housing 46 in communication with the first end portion 80 and carries an annular groove 86 formed therein in which a resilient annular sealing member 88, such as a rubber or synthetic resin O-ring, is mounted to provide a fluid-tight seal between the first end portion 80 and the open end portion 56 of the filter housing 44. A radially outwardly extending annular flange 90 is formed on the pump housing 46 intermediate the cylindrical outer surfaces 78 and 84 and abuts the flange 52 of the filter housing 44 when the filter housing and pump housing are assembled together.

A longitudinal passage 92 communicates between the first and second end portions 80 and 82 of the pump housing 46. The passage 92 includes a pump cavity 94 formed in the pump housing and communicating with the first end portion 80. A first counterbore 96 is formed in the longitudinal passage 92 and communicates with the transverse end face of the second end portion 82. A second counterbore 98 is also formed in the longitudinal passage 92 and communicates in coaxial alignment with the first counterbore 96. A third counterbore 100 is formed in the longitudinal passage 92 and communicates in coaxial alignment with the second counterbore 98. A longitudinal shaft 102 is journaled in the longitudinal passage 92 and is extended through a seal 104 disposed, as by a press fit, in the third counterbore 100. A resilient annular sealing member 106, such as a rubber or synthetic resin O-ring is positioned around the seal 104 in a suitable groove.

A spur gear 110 is drivingly secured to the first end portion 112 of the shaft 102 and is disposed within the pump cavity 94. A second spur gear 114 is journaled on a stub shaft 116 mounted in the pump housing 46 and meshingly engages the spur gear 110 within the pump cavity 94 for rotation about the shaft 116 in response to rotation of the spur gear 110.

A wear plate 118 extends across and covers the pump cavity 94 and is secured to the first end portion 80 of the pump housing 46 by means of four threaded studs 120 and four wing nuts 122. The wear plate 118 fully encloses the pump cavity 94 and maintains the spur gears 110 and 114 in position therein.

A first port 124 communicates between the pump cavity 94 and the first end portion 80 of the pump housing 46. The first port 124 is positioned in communication with the open end portion 56 of the filter housing 44 and, when properly assembled, is located at the lowermost portion of the filter cavity 54 where cooking oil will be received into the first port 124 and directed to the pump cavity 94 when the pump is operating.

A second port 126 is formed in the pump housing 46 and communicates between the pump cavity 94 and the outer surface 78. A second conduit 128 communicates with the port 126 and extends from the pump housing into the well 18 of the heating unit 12 and preferably terminates near or slightly beneath the surface of cooking oil 22. The conduit 128 preferably comprises two segments 130 and 132, telescopically related and sealingly interconnected by means of a compression nut coupling 134. This construction of the conduit 128, as with the previously described construction of the conduit 66, permits the length of the horizontal run of the conduit 128 to be adjusted so that the segment 132 of the conduit extending into the well near or below the surface of the cooking oil can be positioned against the wall of the well to minimize the intrusion thereof into the working area of the well.

The second end portion 136 of the shaft 102 terminates within the second counterbore 98 and includes a transverse groove or slot 138 formed therein to drivingly engage the drive shaft 140 of the pump drive motor 48.

The pump drive motor 48 is preferably substantially cylindrically shaped with the drive shaft 140 thereof axially aligned with the outer surface 142 of the motor. A mounting plate 144 is secured to one end of the pump drive motor by means of a plurality of threaded bolts 146. The mounting plate 144 includes a cylindrical surface 148 which communicates with an outwardly extending radial shoulder 150. The cylindrical surface 148 is closely received within the first counterbore 96 of the pump housing 46 and the radial shoulder 150 abuttingly engages the end face of the second end portion 82 of the pump housing. When the pump drive motor 48 and pump housing 46 are assembled as described, the drive shaft 140 is drivingly engaged with the groove 138 of the shaft 102 of the pump whereby rotation of the pump drive motor 48 is imparted via the drive shaft 140 and pump shaft 102 to the spur gear 110 and by the spur gear 110 to the spur gear 114 to cause the pump to operate and move cooking oil through the pump housing 46 from the first port 124 through the second port 126 and second conduit 128 to the well 18 of the cooking oil heating unit 12.

Figure 2:
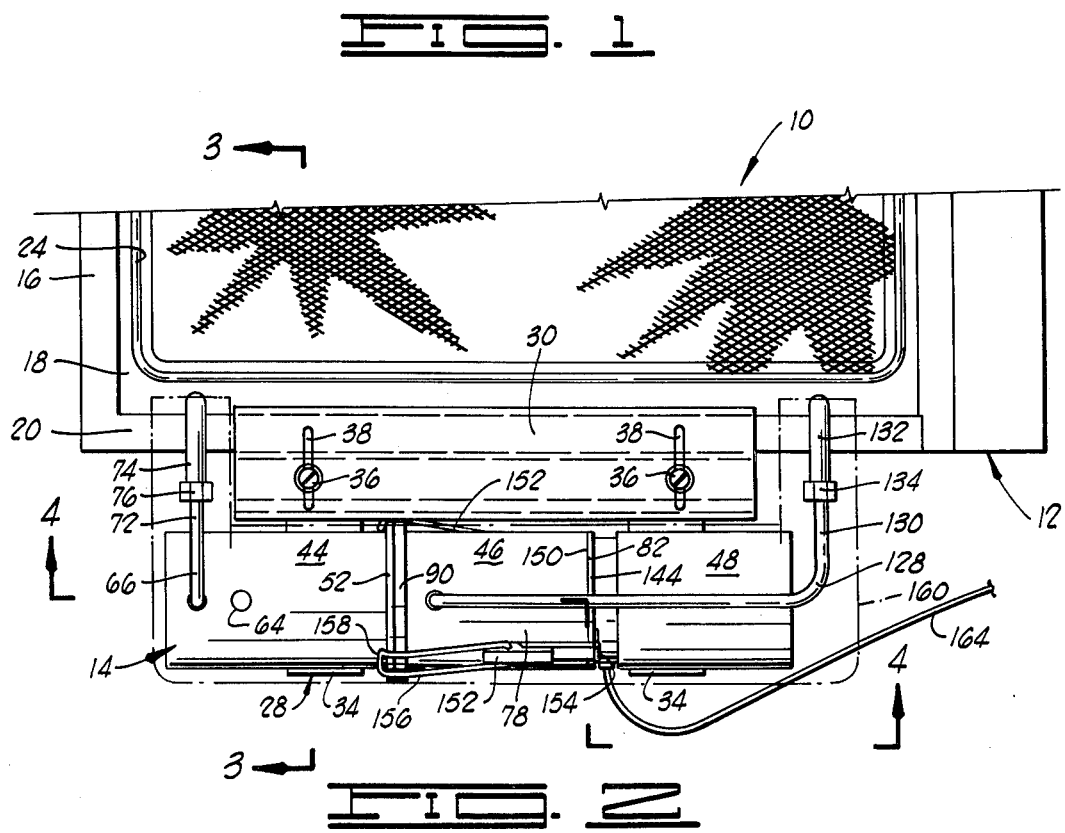
FIG. 2 is a partial top plan view of the deep fat fryer assembly of FIG. 1.

The filter housing 14, pump housing 46 and pump drive motor 48 are preferably mutually secured together as shown in FIGS. 1, 2, 4 and 5 by means of two drawbolts 152 disposed on opposite sides of the cylindrically shaped cooking oil filtration and recirculation assembly 14. The drawbolts 152 are of substantially conventional construction with the first end portion 154 of each drawbolt fixedly secured in hinged relation to the mounting plate 144 of the pump drive motor 48. On the second end portion 156 of each drawbolt 152 is a radially inwardly bent hasp 158 which engages the flange 52 of the filter housing 44. When the drawbolts 152 are actuated and snapped into position as illustrated in the drawings, it will be seen that the filter housing 44, pump housing 46 and pump drive motor 48 are mutually secured into a rigid, unitary, cylindrically shaped cooking oil filtration and recirculation assembly 14. The employment of the drawbolts 152 to mutually secure the three elements of the cooking oil filtration assembly 14 together permits the three elements to be conveniently disassembled for cleaning and maintenance.

The support bracket assembly 28 further preferably includes a heat and spatter shield 160 which extends over the cooking oil filtration assembly 14 and a substantial portion of the conduits 66 and 128 during the operation of the deep fat fryer assembly 10. The heat and spatter shield is preferably formed of sheet metal, such as stainless steel, and includes a downwardly extending leg portion 162 which is suitably engaged and supported by the filtration assembly support bracket 34 as shown in FIG. 3. The heat and spatter shield 160 can be conveniently lifted from its position protecting the cooking oil filtration and recirculation assembly 14 from oil spatters from the cooking oil heating unit 12 when it is desired to gain access to the cooking oil filtration assembly for cleaning or maintenance.

In operation, the cooking oil filtration and recirculation assembly 14, cooking oil heating unit 12 and support bracket assembly 28 are assembled as described above to form a deep fat fryer assembly 10. With the various elements of the deep fat fryer assembly 10 thus assembled, the electric pump drive motor 48 is connected to a suitable source of electric power by means of the electric power cord 164 thus energizing the motor to drive the gear pump in the pump housing 46. As the cooking oil is drawn into the pump housing 46 by the operation of the counterrotating spur gears 110 and 114, hot cooking oil from the well 18 of the cooking oil heating unit 12 is drawn through the conduit 66, the filter cavity 54, filter medium or material 62 and foraminous partition 60 into the first port 124. As the cooking oil moves through the filter housing 44, residual bits of burnt grease, food particles and carbon are strained from the cooking oil by the filter medium or material 62 so that the cooking oil passing through the foraminous partition 60 and entering the first port 124 of the pump is cleaned and ready for reutilization. The pump directs the clean cooking oil through the second port 126 and conduit 128 where the oil is returned to the well 18 at the opposite end thereof from the point of entry 70 of the oil into the conduit 66. There is thus maintained a circulation within the body of cooking oil 22 contained within the well 18 as the oil moves from one end of the well through the cooking oil filtration assembly 14 to the other end of the well. The location of the conduit segments 72 and 132 in the well 18 does not interfere in any way with the operation of the cooking oil heating unit 12 for cooking purposes.

An important feature of the present invention is the manner in which the cooking oil filtration and recirculation assembly 14 is constructed. The three-part construction of the assembly 14, which includes the filter housing 44, pump housing 46 and pump drive motor 48, conveniently mutually secured by the two drawbolts 152, permits quick and easy accessibility to the filter and to the gear pump for maintenance purposes. Thus, at such time as it may be desired to clean the interior of the filter housing 44 and renew the filter medium or material 62 located therein, this can be quickly and easily accomplished by disconnecting the two drawbolts 152 and separating the filter housing 44 from the pump housing 46 and permits the filter medium or material 62 to be quickly removed, and, if desired, permits the annular seal 88 to be replaced after the filter medium or material has been cleaned or replaced and reinserted within the filter cavity 54. Maintenance of the gear pump is easily carried out by removing the wing nuts 122 and wear plate 118 from the pump housing 46 thus exposing the pump cavity 94 and spur gears 110 and 114.

The deep fat fryer assembly 10 of the present invention can be used for continuously cleaning the cooking oil used therein without incurring down time on the fryer per se. Tests with the system have indicated that the cooking oil can be made to last from fifty to one hundred percent longer without replacement through the employment of the present invention. Little or no cleaning of the well 18 of the cooking oil heating unit 12 due to the accumulation of burnt grease and food particles therein is required.

Although a preferred embodiment of the invention has been herein described and illustrated in the drawings, it will be understood that various changes and modifications can be effected in the described structure without departure from the basic principles of the invention. Changes and innovations of such type as do not entail a departure from the basic principles are therefore deemed to be circumscribed by the spirit and scope of the invention except as the same may be limited by the appended claims or reasonable equivalents thereof.

What is claimed is:

1. A deep fat fryer assembly comprising in combination:
    a deep fat fryer well for containing cooking oil and having a rim extending around at least a portion of the well;
    a substantially cylindrically shaped cooking oil filtration assembly having a longitudinal axis, said filtration assembly including:
        a filter housing having a longitudinal substantially cylindrical outer surface and having a filter cavity formed therein communicating with an open transverse end portion thereof;
        a pump housing having a longitudinal substantially cylindrical outer surface coaxially aligned with said filter housing and having a first and second transverse end portions, the first end portion thereof communicating with the open end portion of said filter housing;
        filter means disposed within the filter cavity for filtering cooking oil passing therethrough;
        pump means disposed in said pump housing and having a first port communicating with the open end portion of said filter housing and a second port communicating with the outer surface of said pump housing for pumping cooking oil through said pump housing; and
        a motor mounted on the second end portion of said pump housing and having an output shaft drivingly connected to said pump means;
    bracket means for supporting said cooking oil filtration assembly adjacent the rim of said deep fat fryer well;
    first conduit means communicating with the filter cavity for conveying cooking oil between said deep fat fryer well and the filter cavity;
    second conduit means communicating with the second port of said pump means for conveying cooking oil between said pump means and said deep fat fryer well; and
    a shield supported by said bracket means and positioned above said cooking oil filtration assembly and over at least a portion of said first and second conduit means at the location where said first and second conduit means extend between said deep fat fryer well and said filter cavity and pump means, respectively, whereby said cooking oil filtration assembly is shielded from contact by a person adjacent the deep fat fryer.

2. The deep fat fryer assembly as defined in claim 1 wherein said cooking oil filtration assembly is characterized further to include:
    a foraminous partition extending across the filter cavity intermediate the open end portion of said filter housing and said filter means.

3. The deep fat fryer assembly as defined in claim 1 wherein said cooking oil filtration assembly is characterized further to include:
    means for mutually engaging the open end portion of said filter housing in sealing engagement with the first end portion of said pump housing.

4. The deep fat fryer assembly as defined in claim 1 wherein said cooking oil filtration assembly is characterized further to include:
    clamp means for mutually engaging said motor with the second end portion of said pump housing and the first end portion of said pump housing in sealing engagement with the open end portion of said filter housing.

5. The deep fat fryer assembly as defined in claim 4 wherein said clamp means is characterized further to include:
    a plurality of drawbolts each secured at one end thereof to said motor and engageable at the opposite end thereof with said filter housing.

6. The deep fat fryer assembly as defined in claim 1 wherein said pump means is characterized further to include:
    a gear pump including a first spur gear journaled in said pump housing and drivingly engaged with the output shaft of said motor, and a second spur gear journaled in said pump housing and meshingly engaged with said first spur gear.

7. The deep fat fryer assembly as defined in claim 6 wherein said pump housing is characterized further to include:
    a pump cavity formed therein and communicating with the first end portion thereof and encompassing said first and second spur gears, said pump cavity communicating with the first and second ports of said pump means; and a wear plate removably secured to the first end portion of said pump housing and extending across said pump cavity communicating therewith.

8. A deep fat fryer assembly as defined in claim 1 wherein said conduit means includes:
   a first conduit extending from said well to said filter unit and having a horizontally extending portion of said first conduit adjustable in its length to facilitate lengthening and shortening said first conduit as said support bracket is adjustably positioned relative to said inner angle bracket and outer angle bracket for adjusting the spacing of said filtration assembly from said well; and
   a second conduit extending between said pump subassembly and said well for circulating clean cooking oil from said pump to said well, said second conduit including a horizontally extending portion which is adjustable in its length to lengthen and shorten said horizontally extending portion of the second conduit in correspondence to adjustment of said support bracket relative to said inner angle bracket and outer angle bracket in adjusting the position of said filtration assembly in relation to said well.

9. A cooking oil filtering and circulating system adapted for use with a deep fat fryer of the type having a well formed therein for containing cooking oil, comprising:
   an elongated cooking oil filtration assembly having a longitudinal axis, said filtration assembly including:
      a filter housing having a longitudinal axis coaxial with the axis of said filtration assembly and having a filter cavity formed therein communicating with an open transverse end portion thereof;
      a pump housing having a longitudinal axis coaxially aligned with the axis of said filter housing and having first and second transverse end portions, the first end portion thereof communicating with the open end portion of said filter housing;
      filter means disposed within the filter cavity for filtering cooking oil passing therethrough;
      pump means disposed in said pump housing and having a first port communicating with the open end portion of said filter housing and a second port communicating with the exterior of said pump housing for pumping cooking oil through said pump housing; and
      a motor mounted on the second end portion of said pump housing and having an output shaft drivingly connected to said pump means;
   first conduit means communicating with the filter cavity for conveying cooking oil between the well of a deep fat fryer and the filter cavity;
   second conduit means communicating with the second port of said pump means for conveying cooking oil between said pump means and the well of a deep fat fryer;
   support bracket means engageable with said cooking oil filtration assembly for supporting said assembly from a wall of said well of said deep fat fryer; and
   a shield supported by said support bracket means and positioned above said cooking oil filtration assembly and above said first and second conduit means where said first and second conduit means extend between the well of said deep fat fryer and the filter cavity, and between the well of said deep fat fryer and said pump means, respectively.

10. The cooking oil filtering and circulating system as defined in claim 9 characterized further to include:
    support bracket means engageable with said cooking oil filtration assembly for supporting said assembly on a deep fat fryer adjacent the well thereof.

11. The cooking oil filtering and circulating system as defined in claim 9 wherein said cooking oil filtration assembly is characterized further to include:
    a foraminous partition extending across the filter cavity intermediate the open end portion of said filter housing and said filter means.

12. The cooking oil filtering and circulating system as defined in claim 9 wherein said cooking oil filtration assembly is characterized further to include:
    means for mutually engaging the open end portion of said filter housing in sealing engagement with the first end portion of said pump housing.

13. The cooking oil filtering and circulating system as defined in claim 9 wherein said cooking oil filtration assembly is characterized further to include:
    clamp means for mutually engaging said motor with the second end portion of said pump housing and the first end portion of said pump housing in sealing engagement with the open end portion of said filter housing.

14. The cooking oil filtering and circulating system as defined in claim 13 wherein said clamp means is characterized further to include:
    a plurality of drawbolts each secured at one end thereof to said motor and engageable at the opposite end thereof with said filter housing.

15. The cooking oil filtering and circulating system as defined in claim 9 wherein said pump means is characterized further to include:
    a gear pump including a first spur gear journaled in said pump housing and drivingly engaged with the output shaft of said motor, and a second spur gear journaled in said pump housing and meshingly engaged with said first spur gear.

16. The cooking oil filtering and circulating system as defined in claim 15 wherein said pump housing is characterized further to include:
    a pump cavity formed therein and communicating with the first end portion thereof and encompassing said first and second spur gears, said pump cavity communicating with the first and second ports of said pump means; and
    a wear plate removably secured to the first end portion of said pump housing and extending across said pump cavity communicating therewith.

17. A deep fat fryer assembly comprising in combination:
    a deep fat fryer well for containing cooking oil and having a rim extending around at least a portion of the well;
    a substantially cylindrically shaped cooking oil filtration assembly having a longitudinal axis, said filtration assembly including:
       a filter housing having a longitudinal substantially cylindrical outer surface and having a filter cavity formed therein communicating with an open transverse end portion thereof;
       a pump housing having a longitudinal substantially cylindrical outer surface coaxially aligned with said filter housing and having first and second transverse end portions, the first end portion thereof communicating with the open end portion of said filter housing;

filter means disposed within the filter cavity for filtering cooking oil passing therethrough;

pump means disposed in said pump housing and having a first port communicating with the open end portion of said filter housing and a second port communicating with the outer surface of said pump housing for pumping cooking oil through said pump housing; and a motor mounted on the second end portion of said pump housing and having an output shaft drivingly connected to said pump means;

bracket means for supporting said cooking oil filtration assembly adjacent the rim of said deep fat fryer well;

first conduit means communicating with the filter cavity for conveying cooking oil between said deep fat fryer well and the filter cavity;

second conduit means communicating with the second port of said pump means for conveying cooking oil between said pump means and said deep fat fryer well;

a shield supported by said bracket means and positioned above said cooking oil filtration assembly and over at least a portion of said first and second conduit means at the location where said first and second conduit means extend between said deep fat fryer well and said filter cavity and pump means, respectively, whereby said cooking assembly is shielded from contact by a person adjacent the deep fat fryer; and valve means communicating with the filter cavity of said filter housing for selectively venting the filter cavity to the atmosphere in response to manipulation of said valve means.

18. A cooking oil filtering and circulating system adapted for use with a deep fat fryer of the type having a well formed therein for containing cooking oil, comprising;

an elongated cooking oil filtration assembly having a longitudinal axis, said filtration assembly including:

a filter housing having a longitudinal axis coaxial with the axis of said filtration assembly and having a filter cavity formed therein communicating with an open transverse end portion thereof;

a pump housing having a longitudinal axis coaxially aligned with the axis of said filter housing and having first and second transverse end portions, the first end portion thereof communicating with the open end portion of said filter housing;

filter means disposed within the filter cavity for filtering cooking oil passing therethrough;

pump means disposed in said pump housing and having a first port communicating with the open end portion of said filter housing and a second port communicating with the exterior of said pump housing for pumping cooking oil through said pump housing; and a motor mounted on the second end portion of said pump housing and having an output shaft drivingly connected to said pump means;

first conduit means communicating with the filter cavity for conveying cooking oil between the well of a deep fat fryer and the filter cavity;

second conduit means communicating with the second port of said pump means for conveying cooking oil between said pump means and the well of a deep fat fryer;

support bracket means engageable with said cooking oil filtration assembly for supporting said assembly from a wall of said well of said deep fat fryer;

a shield supported by said support bracket means and positioned above said cooking oil filtration assembly and above said first and second conduit means where said first and second conduit means extend between the well of said deep fat fryer and the filter cavity, and between the well of said deep fat fryer and said pump means, respectively; and valve means communicating with the filter cavity of said filter housing for selectively venting the filter cavity to the atmosphere in response to manipulation of said valve means.

19. A cooking oil filtering and circulating system adapted for use with a deep fat fryer of the type having a well formed therein for containing cooking oil comprising:

a substantially cylindrically shaped cooking oil filtration assembly having a longitudinal axis, said filtration assembly including:

a filter housing having a longitudinal cylindrical outer surface, and having a filter cavity formed therein communicating with an open transverse end portion thereof;

a pump housing having a longitudinal cylindrical outer surface coaxially aligned with the outer surface of said filter housing and having first and second transverse end portions, the first end portion thereof communicating with the open end portion of said filter housing;

filter means disposed within the filter cavity for filtering cooking oil passing therethrough;

pump means disposed in said pump housing and having a first port communicating with the open end portion of said filter housing and a second port communicating with the outer surfaces of said pump housing for pumping cooking oil through said pump housing; and a motor mounted on the second end portion of said pump housing and having an output shaft drivingly connected to said pump means;

a first conduit communicating with the filter cavity for conducting cooking oil between the well of the deep fat fryer and the filter cavity;

a second conduit communicating with the second port of said pump means for conveying cooking oil between said pump means and the well of a deep fat fryer;

support bracket means engageable with said cooking oil filtration assembly for supporting said assembly on a deep fat fryer adjacent the well thereof;

a foraminous partition extending across the filter cavity intermediate the open end portion of said filter housing and filter means;

means for mutually engaging the open end portion of said filter housing in sealing engagement with the first end portion of said pump housing;

clamp means for mutually engaging said motor with the second end portion of said pump housing and the first end portion of said pump housing in sealing engagement with the open end portion of said filter housing, said clamp means including a plurality of draw bolts each secured at one end thereof to said motor and engageable at the opposite end thereof with said filter housing; and valve means communicating with the filter cavity of said filter housing for selectively venting the filter cavity to the atmosphere in response to manipulation of said valve means.

20. A deep fat fryer assembly comprising in combination:
  a deep fat fryer well for containing cooking oil and having a horizontally extending rim around at least a portion of the well;
  a substantially cylindrically shaped cooking oil filtration assembly having a longitudinal axis extending substantially parallel to said rim on one side of said well, said filtration assembly including: filter means having opposite ends;
  a pump subassembly including a pump housing and a pump, and having a first end abutting and operatively associated with said filter means;
  a motor drivingly connected to said pump and positioned at the opposite end of said pump subassembly from said filter means; and
  draw bolts having opposite ends connected to said filter means and motor and each bridging across said pump subassembly, said draw bolts each including relatively movable parts for manually shortening the length thereof between said ends of the draw bolts to snap connect said filter means, pump assembly and motor to each other in end-to-end operating relation along the longitudinal axis of said oil filtration assembly;
  a support bracket assembly for supporting said cylindrically shaped cooking oil filtration assembly from the rim of said well in a position alongside said well with the longitudinal axis of said filtration assembly extending parallel to the portion of said rim engaged by said support bracket, said support bracket including
    an inner angle bracket manually removably engaged with said rim;
    an outer angle bracket adjustably connected to said inner angle bracket for selectively adjusting the distance which said oil filtration assembly is spaced from said well;
    a filtration assembly support bracket adjustably connected between said inner and outer angle brackets and removably supporting said filtration assembly; and
  conduit means connected between said well and said filtration assembly for circulating cooking oil from said well through said filter means and back to said well when said motor is energized.

21. A deep fat fryer assembly comprising in combination:
  a deep fat fryer well for containing cooking oil and having a horizontally extending rim around at least a portion of the well;
  a substantially culindrically shaped cooking oil filtration assembly having a longitudinal axis extending substantially parallel to said rim on one side of said well, said filtration assembly including: filter means having opposite ends;
  a pump subassembly including a pump housing and pump, and having a first end abutting and operatively associated with said filter means; and
  a motor drivingly connected to said pump and positioned at the opposite end of said pump subassembly from said filter means; and
  means detachably retaining said filter means, pump subassembly and motor in end-to-end relation and aligned along the longitudinal axis of said filtration assembly;
  a support bracket assembly for supporting said cylindrically shaped cooking oil filtration assembly from the rim of said well in a position alongside said well with the longitudinal axis of said filtration assembly extending parallel to the portion of said rim engaged by said support bracket, said bracket including:
    an inner angle bracket manually removably engaged with said rim;
    an outer angle bracket adjustably connected to said inner angle bracket for selectively adjusting the distance separating portions of said inner and outer angle brackets; and
    a filtration assembly support bracket adjustably connected between said inner and outer angle brackets and removably supporting said filtration assembly;
  conduit means connected between said well and said cooking oil filtration assembly for circulating cooking oil from said well to said filtration assembly and back to said well; and
  a spatter shield removably positioned over said filtration assembly and including portions extending over and covering said conduit means to prevent cooking oil from spattering from said well onto said filtration assembly, and to prevent manual contact with said filtration assembly and conduit means.

* * * * *